United States Patent Office 3,232,124
Patented Feb. 1, 1966

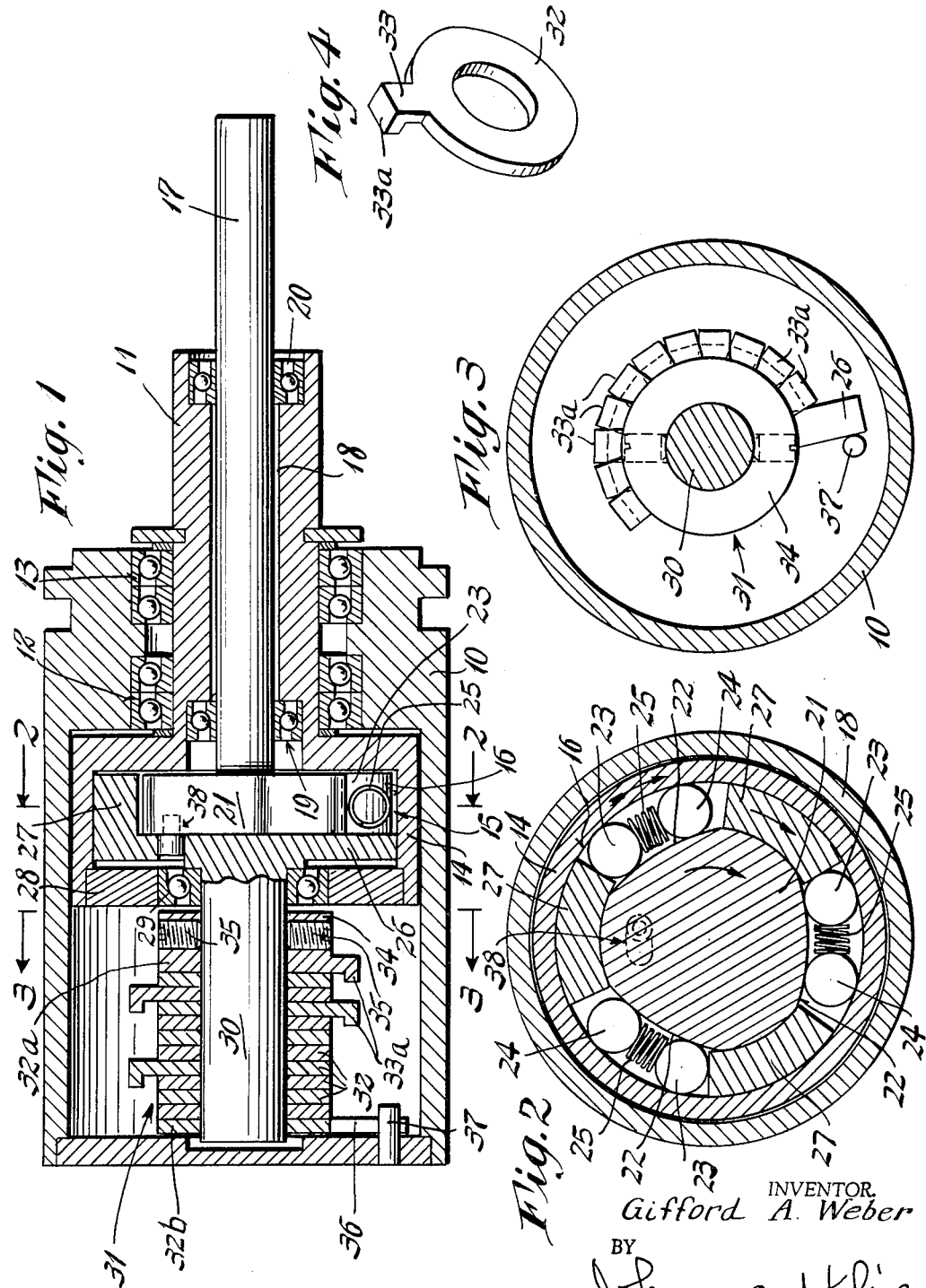

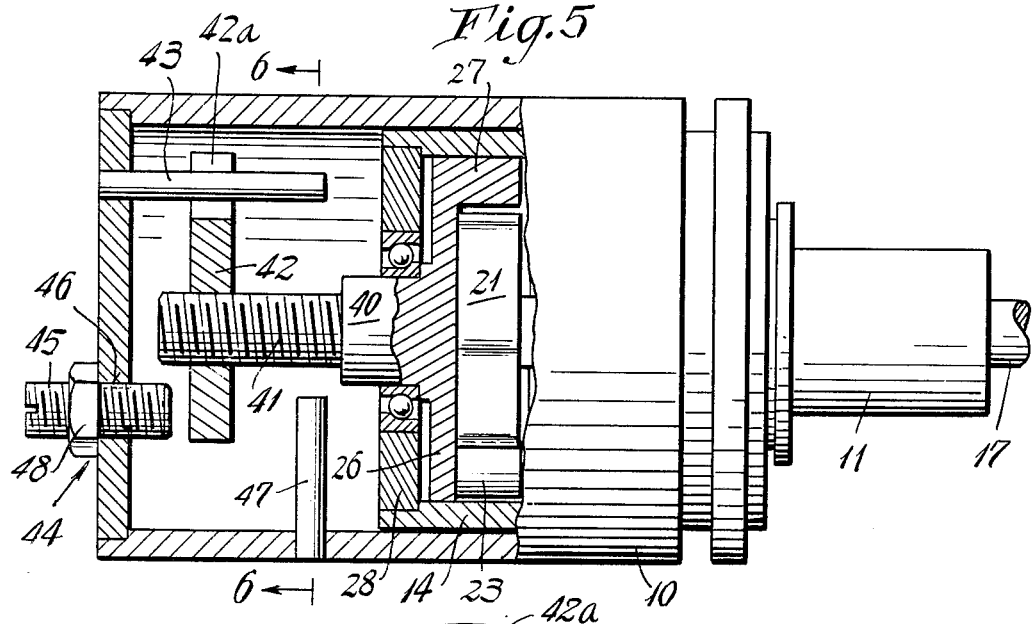
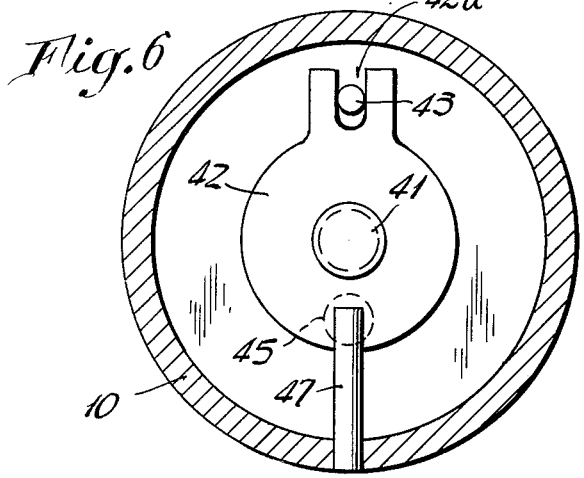

3,232,124
SHAFT POSITIONING DEVICE
Gifford A. Weber, Wayne, N.J., assignor to Occo Manufacturing Corporation, South Hackensack, N.J., a corporation of New Jersey
Filed Dec. 10, 1963, Ser. No. 329,509
9 Claims. (Cl. 74—10.2)

This invention relates to a device for stopping and positioning a shaft in a predetermined position, and is particularly adapted for use in positioning servomechanisms and related devices.

Heretofore, positioning devices have required a limited travel for the driven element being positioned while the input shaft driven by a prime mover continues to operate. This is particularly true in the field of servomotors, and to accomplish this it was proposed to provide a stop mechanism which will limit the travel of the driven member or output shaft to the required travel and a slip clutch is inserted between the stop and an input shaft driven by a prime mover to limit the torque transmitted to the driven member to prevent damage to the stop mechanism. This had the disadvantage in that any limitation on the torque transmitted to the driven member or output shaft to prevent damage to the stop also limits the torque available to drive the driven load. This results quite frequently in the torque available to drive the load being at a minimum.

The present invention overcomes this disadvantage by providing a device in which the input shaft is capable of continuous full torque operation and the stop means and coupling for controlling the positioning of the driven member or shaft will transmit the full torque to the driven shaft while providing a complete protection to the stop mechanism, which stop mechanism releases the drive to and stops the travel of the driven member to any predetermined amount.

In the preferred form of the invention this is accomplished by providing a coupling including a self-locking clutch in the drive between the input or driving and the output or driven shafts which will transmit the full available torque of the prime mover to the driven shaft and by providing a control member for the clutch which will quickly and completely break the driving connection between the driving and driven safts and locate the driven shaft in a predetermined position with a minimum of load being transmitted to the stop mechanism.

Other features and advantages of the invention will be apparent from the specification and claims when considered in connection with the accompanying drawings in which:

FIGURE 1 is a sectional view of the positioning device of the present invention.

FIG. 2 is a sectional view taken along line 2—2 of FIG. 1.

FIG. 3 is a sectional view taken along line 3—3 of FIG. 1.

FIG. 4 is a perspective view of one of the stop elements.

FIG. 5 is a view, partly in section, of another form of positioning means showing a different type of stop arrangement.

FIG. 6 is a sectional view taken along line 6—6 of FIG. 5.

While the positioning means of the present invention can be utilized in various shaft arrangements, in the herein illustrated form of the invention it is shown as having the input and output shafts concentrically arranged and projecting from the same end of the coupling device.

As shown in FIG. 1, the device comprises a housing 10 which is adapted to be fixed in position. An input or driving shaft 11 in the form of a sleeve is mounted for free rotation in the housing by bearings 12, 13 to be driven by any suitable prime mover (not shown). The inner end of the sleeve is provided with a cup-shaped member 14 having a cylindrical inner bore 15 provided with an accurately disposed surface 16 concentric to the axis of the shaft to provide a race for the coupling member. The output or driven shaft 17 is mounted within the bore 18 in the sleeve forming the driving shaft 11 so as to be concentric with the sleeve and is rotatably carried by ball bearings 19, 20 It can be connected to any desired load (not shown). The inner end of the output shaft carries a cam member 21 which is disposed within the race. The cam member has a plurality of uniformly spaced cam surfaces 22 thereon disposed in predetermined spaced relation to the surface of the race. The driving or locking elements for connecting the cam to the race comprise pairs of balls or rollers 23, 24 or the like locking elements for each cam surface 22, as shown in FIG. 2, which are normally urged into clamping or locking relation in the bite formed by the surface 16 and cam surface 22 by a spring 25 disposed between them. Thus, the self-locking coupling normally transmits the drive from the driving shaft to the driven shaft, with the rollers effecting the drive in either direction of rotation of the input shaft.

In order to release the coupling and to stop or position the output shaft in a predetermined position, a novel control means is provided. This comprises a releasing element 26 which overlies the end of the cam and has releasing elements 27 projecting therefrom into the space between the cam and the race and located between the sets of rollers, as shown in FIGS. 1 and 2. The releasing member is held in assembled position by a closure plate 28 secured by a forced fit or the like in the end of the cup as shown in FIG. 1, and is rotatably mounted thereby by ball bearings 29 so as to be rotatable with respect thereto as will be explained.

The releasing member is rotatable with the coupling through engagement of the releasing elements 27 on the releasing member with the rollers so long as the load on the releasing member is insufficient to overcome the springs 25 and move the locking elements out of driving or coupling relation.

In order to control and stop the driven shaft in a predetermined position, a novel control means is provided which includes means for stopping the release means and supplying a load thereto sufficient to overcome the springs 25 and move the roller out of the bite so as to release the coupling. Preferably the means for controlling the release means comprises a control shaft 30 carried by and rotatable with the releasing means and a stop means cooperating therewith. In the form of the invention shown in FIG. 1, the stop means comprises a pile-up unit 31 having a series of apertured plates 32, such as shown in FIGS. 1 and 4 adapted to be supported on said control shaft. Each of the plates has an L-shaped projecting lug 33 extending therefrom. The base 33a of the lug has an axially extending portion which is, as shown in FIG. 1, slightly less than the thickness of the plate so as to operate to pick up only the adjacent plate. The first plate 32a has an enlarged base 34 whereby it is adjustably secured to the control shaft of the releasing member by set screws 35 to rotate therewith. The other plates of the unit are stacked on the shaft 30 for relative rotation with respect to one another on the shaft. The last plate 32b in the pile has an elongate lug 36 which is adapted to engage a stop pin 37 carried by the end of the housing.

Thus it will be seen that as the input shaft drives the output shaft through the coupling, the release member will rotate with the coupling. This will rotate the control shaft and cause the plate 32a to be rotated relative to the other plates until the base of the lug 33a engages the next plate and causes it to rotate. This will continue until all of the lugs 33 are in engagement, as shown in FIG. 3, and the elongate lug 36 is in engagement with the stop pin 37. As soon as the stop pin is engaged, the release member will stop while the coupling rotates relative thereto through a small angle and will cause the release elements to engage the driving rollers, as shown in FIG. 3, and move them out of driving relationship to uncouple and break the drive to the driven shaft.

The release member is connected to the cam 21 by a pin and slot connection 38 as shown in FIG. 2 and it will immediately stop the rotation of the uncoupled driven or output shaft in a predetermined position while permitting continued full torque operation of the input shaft. By adjusting the position of the plate 32a and the number of plates in the pile-up unit, the number of turns and stopping position of the driven shaft can be adjusted and controlled.

In the form of the invention shown in FIG. 5, the coupling is the same as FIG. 1; however, the control shaft 40 of the release member is provided with threads 41 upon which a nut 42 is mounted. The nut is retained from rotation by a slot 42a therein operating in a fixed pin 43 carried by the housing. Thus, as the release member rotates with the coupling it will cause the nut to feed along the threads and when it engages a stop 44 carried by the housing, it will stop the rotation of the release member sufficiently to cause it to move relative to the coupling and release the locking elements or rollers from locked relation and uncouple or break the drive. Thereafter, the uncoupled output or driven shaft is stopped by the lost motion connection in the manner described above.

The stop 44 in this form of the invention may be adjusted in many ways to provide for controlling number of turns and position of the output shaft. In the preferred form the stop 44 comprises a threaded stud 45 which is adjustable in a threaded aperture 46 in the end wall of the housing for adjustment toward or away from the nut to vary the length of travel of the nut 42 to and form a transversely disposed pin 47 which engages the nut at the other end of its travel to stop the nut in its inner position. The stud is locked in adjusted position by a lock nut 48.

In both of the foregoing positioning devices it will be seen that the present invention provides for a full torque transmission from the input shaft to drive the load on the output shaft and enables the coupling to be released quickly and with a minimum of strain on the stop members and accurately positions the output shaft for each operation of the coupling. Further, the devices will operate equally well with the shafts being rotated in either direction.

Variations and modifications may be made within the scope of the claims and portions of the improvements may be used without others.

I claim:

1. In a positioning device, a driving input shaft, a driven output shaft, means rotatably mounting said driving input shaft and said driven output shaft, a self-locking releasable coupling connecting said shafts for simultaneous rotation, and stop means including a fixed means and a release means connected to the coupling to be normally rotated with the coupling and having limited relative movement therewith, said release means having a lost motion connection to the output shaft and said release means including means cooperating with said fixed means for relatively moving the release means with respect to said coupling and automatically releasing the coupling and stopping the driven output shaft in a predetermined location.

2. In a positioning device, a driving input shaft, a driven output shaft, means rotatably mounting said driving input shaft and said driven output shaft, a self-locking releasable coupling connecting said shafts and having spring means normally urging a plurality of locking elements into locking relation, and stop means having a stop member and including release means having a control shaft, said release means having elements cooperating with the locking elements and being rotatable thereby, means on said control shaft for engaging said stop member for stopping the rotation of said release means, the stopping of the release means causing the elements on the release means to move the locking elements against said spring means and automatically releasing the coupling, and means connecting the stopped release means and the driven shaft for thereafter stopping the driven shaft in a predetermined location.

3. In a positioning device, a fixed housing, a driving input shaft rotatably mounted in the housing, a driven output shaft rotatable in the housing, a self-locking releasable coupling having movable locking elements thereon connecting said shafts for simultaneous rotation, and stop means including a fixed means on the housing and a release means having a normal position engaging said coupling elements and rotated with the coupling, said release means having limited relative movement with respect to said coupling from said normal position and having a lost motion connection to the driven shaft, said release means including means cooperating with said fixed means for stopping the rotation thereof and moving said movable locking elements with respect to the coupling and automatically releasing the coupling and stopping the driven shaft in a predetermined location.

4. In a positioning device, a fixed housing, a driving input shaft rotatably mounted in the housing, a driven output shaft rotatable in the housing, a self-locking releasable coupling connecting said shafts and having spring means normally urging a plurality of locking elements into locking relation, and stop means having a stop member carried by the housing and including release means having a control shaft, said release means having elements cooperating with the locking elements and being rotatable thereby, means on said control shaft for engaging said stop member for stopping the rotation of said release means, the stopping of the release means causing the elements on the release means to move the locking elements against said spring means and automatically releasing the coupling, and a lost motion connection between the stopped release means and the driven shaft for thereafter stopping the driven shaft in a predetermined location.

5. In a positioning device, a fixed housing, a driving input shaft rotatably mounted in the housing, a driven output shaft rotatable in the housing, a self-locking releasable coupling connecting said shafts, said coupling comprising a cylindrical race connected to one shaft, a cam means connected to the other shaft, a plurality of locking elements disposed between the cam means and the race, and spring means urging said locking elements into locking relation to drivingly connect said shafts, and stop means having a stop member carried by the housing and including release means having a control shaft, said release means having elements engaging and cooperating with the locking elements and being rotatable thereby, and means on said control shaft for engaging said stop member for stopping the rotation of said release means, the stopping of the release means moving the locking elements against said spring means and automatically releasing the coupling, said release means having a lost motion connection to the driven shaft for thereafter stopping the driven shaft in a predetermined location.

6. In a positioning device, a driving input shaft, a driven output shaft, means rotatably mounting said driving input shaft and said driven output shaft, a self-locking releasable coupling including movable locking elements connecting said shafts, and stop means including a stop member, release means operatively connected to and rotated with the coupling and having a control shaft, a pile-up stop unit on said control shaft actuated in response to rotation of said control shaft for engaging said stop member after a predetermined rotation of the control shaft for stopping said release means, said release means engaging said locking elements and automatically releasing the coupling, said release means having a connection to the driven shaft for thereafter stopping the driven shaft in a predetermined location.

7. In a positioning device, a driving input shaft, a driven output shaft, means rotatably mounting said driving input shaft and said driven output shaft, a self-locking releasable coupling including movable locking elements connecting said shafts, and stop means including a stop member, release means operatively connected to and rotated with the coupling and having a lost-motion connection to said driven output shaft, said release means having a control shaft, a pile-up stop unit on said control shaft and operable in response to rotation of said control shaft for engaging said stop member for stopping said release means, said pile-up unit having adjustable means which is adjustable to stop the release means after a predetermined rotation of the control shaft and the release means, when stopped, engaging said locking elements and automatically releasing the coupling to the driven shaft and thereafter stopping the driven shaft in a predetermined location.

8. In a positioning device, a driving input shaft, a driven output shaft, means rotatably mounting said driving input shaft and said driven output shaft, a self-locking releasable coupling connecting said shafts, and stop means including a stop member, release means cooperating with and rotated by the coupling and having a control shaft provided with threads, a nut mounted on the threads of said control shaft and means for holding said nut against rotation, said nut being movable therealong in response to rotation of said control shaft for engaging said stop member for stopping said release means and automatically releasing the coupling, said release means having a connection to the driven shaft for thereafter stopping the driven shaft in a predetermined location.

9. In a positioning device, a fixed housing, a driving input shaft rotatably mounted in the housing, a driven output shaft rotatable in the housing, a self-locking releasable coupling connecting said shafts and having spring means normally urging a plurality of locking elements into locking relation, and stop means having a stop member adjustably carried by the housing adjustable thereon to vary the operation and position of the output shaft, said stop means including release means having a threaded control shaft, said release means having elements cooperating with the locking elements and being rotatable thereby, nut means on the threads of said control shaft, and means for holding said nut against rotation, said nut being fed therealong in response to rotation of the control shaft to engage said stop member for stopping the rotation of said release means, the stopping of the release means causing the release elements to move the locking elements against said spring means and automatically releasing the coupling, said release means having a lost motion connection to the driven shaft for thereafter stopping the driven shaft in a predetermined location.

References Cited by the Examiner

UNITED STATES PATENTS

| | | | |
|---|---|---|---|
| 1,339,052 | 5/1920 | Bauer | 74—10.2 |
| 2,429,901 | 10/1947 | Spraragen | 192—8 |
| 2,547,184 | 4/1951 | Vervest et al. | 74—10.2 |
| 2,616,299 | 11/1952 | Unk et al. | 74—10.2 |
| 2,824,452 | 2/1958 | Colby | 74—10.2 |
| 3,140,618 | 7/1964 | Russell | 74—10.2 |

FOREIGN PATENTS 780,270    7/1957    Great Britain.

BROUGHTON G. DURHAM, *Primary Examiner.*

D. H. THIEL, *Assistant Examiner.*